(12) United States Patent
Naef et al.

(10) Patent No.: US 12,172,252 B2
(45) Date of Patent: Dec. 24, 2024

(54) VACUUM MACHINING SYSTEM HAVING A PROCESS CHAMBER WITH A VACUUM REGULATING VALVE

(71) Applicant: VAT Holding AG, Haag (CH)

(72) Inventors: Simon Naef, Niederteufen (CH); Lukas Gächter, Gams (CH)

(73) Assignee: VAT HOLDING AG, Haag (CH)

( * ) Notice: Subject to any disclaimer, the term of this patent is extended or adjusted under 35 U.S.C. 154(b) by 180 days.

(21) Appl. No.: 17/852,977

(22) Filed: Jun. 29, 2022

(65) Prior Publication Data

US 2023/0001529 A1  Jan. 5, 2023

(30) Foreign Application Priority Data

Jun. 30, 2021 (DE) ............ 10 2021 003 351.5

(51) Int. Cl.
*B23Q 11/00* (2006.01)
*F16K 15/10* (2006.01)
(Continued)

(52) U.S. Cl.
CPC .......... *B23Q 11/0046* (2013.01); *F16K 15/10* (2013.01); *F16K 37/005* (2013.01); *F16K 51/02* (2013.01)

(58) Field of Classification Search
CPC .... B23Q 11/0046; F16K 15/10; F16K 37/005
(Continued)

(56) References Cited

U.S. PATENT DOCUMENTS

| 6,056,266 | A | 5/2000 | Blecha | |
|---|---|---|---|---|
| 6,089,537 | A * | 7/2000 | Olmsted | ............ F16K 51/02 |
| | | | | 251/298 |
| 6,416,037 | B1 | 7/2002 | Geiser | |
| 6,629,682 | B2 | 10/2003 | Duelli | |

(Continued)

FOREIGN PATENT DOCUMENTS

| DE | 10 2020 001 179 A1 | 8/2021 |
|---|---|---|
| TW | 201843552 A | 12/2018 |

OTHER PUBLICATIONS

"German Search Report and Written Opinion: Recherchebereicht," German Application No. 10 2021 003 351.5, Date of Mailing: Feb. 3, 2022, pp. 1-8.

*Primary Examiner* — Omar Flores Sanchez
(74) *Attorney, Agent, or Firm* — Muncy, Geissler, Olds & Lowe, P.C.

(57) ABSTRACT

Vacuum machining system (1), comprising a vacuum chamber (10) and a vacuum regulating valve (20). The vacuum valve (20) has a first valve seat (21a), which has a first valve opening (22a) defining a first opening axis (O) and a first sealing surface extending around the first valve opening (O), and a first valve plate (23a) with a first contact surface corresponding to the first sealing surface. The vacuum machining system further comprises a drive unit (30), which is designed in such a way and is coupled to the first valve plate (23a) in such a way that the latter can be moved at least from an open position to a closed position and back again. The first valve seat (21a) arranged within the vacuum chamber (10) and divides the vacuum chamber (10) into a main process chamber (11) for machining the substrate and into a secondary process chamber (12). The first sealing surface extends orthogonally to the first opening axis (O) and points in the direction of the secondary process chamber (12). The first valve plate (23a) is movably arranged in the secondary process chamber (12).

23 Claims, 2 Drawing Sheets

(51) Int. Cl.
*F16K 37/00* (2006.01)
*F16K 51/02* (2006.01)

(58) Field of Classification Search
USPC .......................................................... 83/395
See application file for complete search history.

(56) References Cited

U.S. PATENT DOCUMENTS

| | | | |
|---|---|---|---|
| 6,994,311 B2 | 2/2006 | Duelli et al. | |
| 2012/0160417 A1* | 6/2012 | Lee | H01L 21/67126 251/12 |
| 2016/0238146 A1* | 8/2016 | Buffa | F16K 15/10 |
| 2018/0005743 A1* | 1/2018 | Plucinski | F16K 31/0675 |
| 2018/0196449 A1* | 7/2018 | Hirata | F16K 37/005 |
| 2018/0259983 A1* | 9/2018 | Madlener | F16K 37/0041 |
| 2019/0129452 A1* | 5/2019 | Hirata | G05D 7/06 |
| 2020/0200289 A1* | 6/2020 | Kozaki | F16K 37/005 |
| 2021/0088370 A1* | 3/2021 | Coxhead | A01J 5/01 |
| 2021/0356049 A1* | 11/2021 | Pfister | F04B 39/1033 |

* cited by examiner

VACUUM MACHINING SYSTEM HAVING A PROCESS CHAMBER WITH A VACUUM REGULATING VALVE

CROSS-REFERENCE TO RELATED APPLICATIONS

The present application claims priority from German patent application No. 10 2021 003 351.5 filed on Jun. 30, 2021, the disclosure of which should be understood to be incorporated into this specification.

BACKGROUND OF THE DISCLOSURE

The invention relates to a vacuum system with a vacuum valve having a plurality of valve plates and a corresponding plurality of valve sub-openings.

Vacuum valves for regulating a volume flow or mass flow and for closing in a substantially gas-tight manner a flow path that leads through an opening formed in a valve housing are generally known from the prior art in various embodiments and are used in particular in vacuum chamber systems in the IC, semiconductor or substrate manufacturing sector, this manufacture having to take place in a protected atmosphere as far as possible without the presence of contaminating particles.

Such vacuum chamber systems comprise in particular at least one evacuable vacuum chamber or process chamber, which is intended to receive semiconductor elements or substrates to be machined or manufactured and has at least one vacuum chamber opening, through which the semiconductor elements or other substrates can be guided into and out of the vacuum chamber, as well as at least one vacuum pump for evacuating the vacuum chamber. By way of example, in a manufacturing plant for semiconductor wafers or liquid crystal substrates, the highly sensitive semiconductor elements or liquid crystal elements pass sequentially through a plurality of process vacuum chambers, in which the parts located within the process vacuum chambers are machined by means of a respective machining device. Both while being machined within the process vacuum chambers and while being transported from chamber to chamber, the highly sensitive semiconductor elements or substrates must always be in a protected atmosphere, in particular in an airless environment.

To this end, on the one hand peripheral valves are used to open and close a gas inlet or gas outlet, and on the other hand transfer valves are used to open and close the transfer openings of the vacuum chambers for inserting and removing the parts.

The vacuum valves through which semiconductor parts pass are referred to as vacuum transfer valves on account of the described field of application and the associated dimensioning, as rectangular valves on account of their mainly rectangular opening cross-section, and also as slide valves, rectangular sliders or transfer slide valves on account of their usual mode of operation.

In contrast, peripheral valves are used in particular to control or regulate the gas flow between a vacuum chamber and a vacuum pump or another vacuum chamber. Peripheral valves are located for example within a pipe system between a process vacuum chamber or a transfer chamber and a vacuum pump, the atmosphere or another process vacuum chamber. The opening cross-section of such valves, also known as pump valves, is generally smaller than in the case of a vacuum transfer valve. Peripheral valves are also referred to as regulating valves since, depending on the field of use, they are used not only to fully open and close an opening, but also to control or regulate a flow by continuously adjusting the opening cross-section between a fully open position and a gas-tight closed position. One possible peripheral valve for controlling or regulating the gas flow is the pendulum valve.

In a typical pendulum valve, as known for example from U.S. Pat. No. 6,089,537 (Olmsted), in a first step a valve plate, which is usually round, is rotated over an opening, which is likewise usually round, from a position that exposes the opening to an intermediate position that covers the opening. In the case of a slide valve, as described for example in U.S. Pat. No. 6,416,037 (Geiser) or U.S. Pat. No. 6,056,266 (Blecha), the valve plate is usually rectangular, as is the opening, and in this first step is slid linearly from a position that exposes the opening into an intermediate position that covers the opening. In this intermediate position, the valve plate of the pendulum valve or slide valve is located opposite and at a distance from the valve seat surrounding the opening. In a second step, the distance between the valve plate and the valve seat is reduced, so that the valve plate and the valve seat are pressed evenly against each other and the opening is closed in a substantially gas-tight manner. This second movement preferably takes place substantially in a direction perpendicular to the valve seat. The sealing may for example take place either via a sealing ring, which is arranged on the closure side of the valve plate and is pressed onto the valve seat extending around the opening, or via a sealing ring on the valve seat, against which the closure side of the valve plate is pressed. Because the closing process takes place in two steps, the sealing ring between the valve plate and the valve seat is subjected to barely any shear forces that would destroy the sealing ring, since the movement of the valve plate in the second step takes place substantially linearly perpendicular to the valve seat.

Various sealing devices are known from the prior art, for example from U.S. Pat. No. 6,629,682 B2 (Duelli). One suitable material for sealing rings and seals in vacuum valves is, for example, fluoro-rubber, also known as FKM, in particular the fluoro-elastomer known under the trade name "Viton", as well as perfluoro-rubber, FFKM for short.

The described multi-stage movement, whereby the closure member is first slid transversely over the opening without the seal coming into contact with the valve seat, and then the closure member is pressed substantially perpendicularly onto the valve seat, not only offers the advantage that the seal is compressed almost exclusively perpendicularly, without there being any transverse or longitudinal load on the seal (avoiding particles), but also the possibility of regulating the flow of a medium (for example process gas) through the valve opening.

Since the valves mentioned above are used, inter alia, in the manufacture of highly sensitive semiconductor elements, it is necessary, as already mentioned, to keep as low as possible any particle generation, which is caused in particular by the actuation of the valve and by the mechanical load on the valve closure member, and the number of free particles in the valve space. Particle generation is primarily a consequence of friction, for example due to metal-metal contact or due to abrasion.

As described above, vacuum regulating valves are used to set a defined process environment in a process chamber. Here, the regulation typically takes place on the basis of a pressure signal, which provides information about the chamber internal pressure, and on the basis of a target variable, i.e. a setpoint pressure that is to be reached by means of the regulation. In the course of the regulation, the position of a valve closure (valve plate) is then varied such that the setpoint pressure is reached within a certain period of time.

A time required for the regulation depends directly on the size of the volume of the process chamber to be evacuated. A comparatively large chamber can therefore be disadvantageous, particularly when machining small substrates, i.e. a large dead volume should accordingly be avoided.

One feature that the above embodiments have in common is that, particularly during a regulation, a regulation curve (volume flow over unit of time) resulting from one of these constructions typically occurs with a disadvantageous curve shape. Specifically, the curve exhibits a clearly inhomogeneous curve shape at the transition from an almost closed valve state to a fully closed valve state due to a "snap-shut effect" that occurs. A flow through the opening is in this case abruptly interrupted. Fine regulation at very low pressures can therefore be achieved only with great difficulty or is impossible.

Another critical factor in connection with semiconductor manufacture is the use and handling of process gas required for individual machining steps. The regulating valve in this case typically also performs the function of providing a defined gas concentration, i.e. regulating it by means of a variable gas outflow through the valve. The process gas is usually fed in on a side of the process chamber opposite the evacuation opening.

Besides the gas concentration and the atmospheric pressure, a distribution of the process gas that is as homogeneous as possible at least in the region of the substrate to be machined is advantageous. A most symmetrical possible flow of gas through the process chamber, i.e. both when feeding in gas and when evacuating, can be helpful for this.

U.S. Pat. No. 6,994,311 B2 discloses a vacuum regulating valve with the aim of establishing a symmetrical flow through an opening in an open valve position. The valve plate is suspended centrally on a guide (valve rod) and can be guided axially, so that a volume flow through the opening can be set as a function of the distance between the valve plate and the valve seat. However, one disadvantage of this solution is that, in order to provide the guide for the valve plate, a mechanical connection must be present in the centre of the valve opening. This mechanical connection eliminates the symmetry of the flow at least in parts and leads to turbulence at the connection elements.

SUMMARY

The object of the invention is therefore to provide a vacuum regulating valve and vacuum machining system which, on the one hand, precisely regulates or sets the valve opening and thus a flow through the opening and, on the other hand, provides a homogeneous fluid distribution in a process chamber.

In particular, one object of the invention is to provide the above improvements while achieving comparatively short movement times of the valve closure.

A further object is to provide a machining system which precisely regulates a fluid flow and provides a comparatively small process volume.

These objects are achieved by implementing the features of the independent claims. Features that further develop the invention in an alternative or advantageous manner are to be found in the dependent claims.

The invention relates to a design of a vacuum machining system which comprises at least one vacuum chamber or process chamber and a vacuum valve, in particular a vacuum regulating valve. The vacuum valve provides for an improved flow of process fluid through and out of a process volume with regard to the homogencity of the flow behaviour. At the same time, a movement time for changing from an open state to a closed state (or vice versa) can be significantly improved, i.e. reduced. By virtue of the design according to the invention, the vacuum chamber is divided into a main chamber and into a secondary chamber by means of the valve, the valve being arranged within the vacuum chamber.

The aforementioned advantages and improvements are in particular provided by dividing a single valve opening, as known to date in the prior art, into a plurality of valve sub-openings of the vacuum valve. The sub-openings are preferably arranged symmetrically around a central valve axis. Each valve sub-opening is provided by a respective valve seat and is surrounded by a respective sealing surface. The sum of the areas of the plurality of valve sub-openings yields the area of the total valve opening.

The total valve opening cross-section results from the sum of the opening cross-sections of the plurality of valve sub-openings, wherein the opening cross-section depends on the respective open state of the valve sub-openings, i.e. on the flow area exposed by the respective valve closure.

The valve seats form in particular a lower boundary of the main process chamber and an upper boundary of the secondary process chamber. A seal for establishing a gas-tight closure of the main process chamber is preferably provided on the underside of the valve seats, that is to say not in the main process chamber but rather in the secondary process chamber. The valve plates for closing the openings are accordingly located in the secondary process chamber and can be moved in this chamber along a movement axis. As an alternative or in addition, the seal may be provided on the valve plates.

Since the valve plates together with the drive components are arranged in or on the secondary process chamber, a fluid flow in or through the main chamber is not influenced by the valve. As a result, an improved symmetrical (through-) flow and thus an improved substrate machining can take place in the main process chamber.

The valve seats are preferably arranged around the central chuck in such a way that fluid can flow around the chuck with a homogeneous flow distribution.

The invention thus relates to a vacuum machining system for machining, in particular by means of deposition (ALD, atomic layer deposition/epitaxy) or etching (ALE, atomic layer etching), a substrate or workpiece, in particular a semiconductor.

The vacuum machining system comprises a vacuum chamber which defines an evacuable internal volume for generating a vacuum and for machining a substrate in the internal volume. The vacuum machining system additionally comprises a vacuum regulating valve for regulating a volume flow or mass flow of a fluid flowing through the vacuum chamber and for interrupting a flow path of the fluid in a gas-tight manner.

The vacuum regulating valve has at least a first valve seat, which has a first valve opening defining a first opening axis and a first sealing surface extending around the first valve opening, and at least a first valve plate with a first contact surface corresponding to the first sealing surface.

The vacuum machining system comprises at least one drive unit, which is designed in such a way and is coupled to the first valve plate in such a way that said valve plate can be moved at least from an open position to a closed position and back again (for example in a motorized manner). In the open position, the first valve plate and the first valve seat are not in contact with each other. In the closed position, sealing contact between the first sealing surface and the first contact surface exists via a sealing element located therebetween, the first valve opening thereby being closed in a gas-tight manner.

According to the invention, the first valve seat is arranged within the vacuum chamber and divides the vacuum chamber into a main process chamber for machining the substrate and into a secondary process chamber. The first sealing surface extends orthogonally to the first opening axis and points in the direction of the secondary process chamber, in particular parallel to the first opening axis. The first valve plate is movably arranged in the secondary process chamber.

In one embodiment, the vacuum regulating valve may have a second valve seat, which has a second valve opening defining a second opening axis and a second sealing surface extending around the second valve opening, and a second valve plate with a second contact surface corresponding to the second sealing surface. The second valve seat may be arranged within the vacuum chamber and, together with the first valve seat, may divide the vacuum chamber into the main process chamber and the secondary process chamber. The second sealing surface extends orthogonally to the second opening axis and points in the direction of the secondary process chamber, in particular parallel to the second opening axis. The second valve plate may be movably arranged in the secondary process chamber.

As a result, a total valve opening of the vacuum regulating valve may be formed at least by the first valve opening as a first valve sub-opening and the second valve opening as a second valve sub-opening.

Providing at least two groups, each comprising at least one valve seat and one valve closure (valve plate), permits a symmetrical arrangement around a centre of the vacuum valve. Consequently, on the one hand a symmetrical volume flow through the valve can be provided, and on the other hand comparatively quick actuation (i.e. quick movement of the valve closures due to the comparatively low individual masses of the valve closures) can be provided, with the possibility of very flexible regulation of the volume flow, i.e. also reaching a comparatively large total opening cross-section from a closed position (and vice versa) within a short time.

In one embodiment, the vacuum regulating valve may have a third valve seat, which has a third valve opening defining a third opening axis and a third sealing surface extending around the third valve opening. A third valve plate with a third contact surface corresponding to the third sealing surface may accordingly be provided.

The third valve seat may be arranged within the vacuum chamber and, together with the first and second valve seat, may divide the vacuum chamber into the main process chamber and the secondary process chamber. The third sealing surface may extend orthogonally to the third opening axis and may point in the direction of the secondary process chamber, in particular parallel to the third opening axis. The third valve plate may be movably arranged in the secondary process chamber.

In this case, the total valve opening may additionally be formed by the third valve opening as a third valve sub-opening.

By arranging a third combination or further combinations of valve seat and valve plate, the symmetry of the total valve opening around a central axis of the valve can be maintained or enhanced, and thus the symmetry of the volume flow (concentrically) through the valve can be further improved.

In particular, the drive unit may be coupled to the second and third valve plate in such a way that the coupled valve plates can be moved at least from a respective open position, in which the respective valve plate and the respective valve seat are not in contact with each other, to a closed position, in which axially sealing contact between the respective sealing surface and the respective contact surface exists via a respective sealing element located therebetween and the respective valve sub-opening is thereby closed in a gas-tight manner, and back again.

The drive unit may be designed, for example, as an actuator or electric motor, in particular a linear motor or stepper motor.

In one embodiment, the vacuum regulating valve may have a coupling arrangement, which coupling arrangement mechanically couples the first valve plate to the second valve plate, and in particular to the third valve plate, in such a way and is connected to the drive unit in such a way that the respective valve plates can be jointly moved by means of the drive unit. The coupling arrangement may be implemented, for example, using a shaft, joints (for example universal joints), bearings and/or transmissions.

Thus, by means of a mechanical solution for example, some or all coupled valve plates can be moved simultaneously. In particular, a homogeneous and symmetrical fluid flow through the valve can thus be achieved in that an equal opening cross-section is provided for all the openings right from when the valve sub-opening is first opened, and the flow through all the openings is equal with regard to the volume flow or mass flow and then remains equal.

According to a further embodiment, the drive unit may have at least a first and a second, in particular a third, drive component, in particular respective motors. The first drive component may be coupled to the first valve plate and the second drive component may be coupled to the second valve plate, and in particular the third drive component may be coupled to the third valve plate.

In contrast to the preceding embodiment, in this variant each of the valve plates can be actuated and moved individually. This permits greater flexibility with regard to setting the flow behaviour through the valve and in particular through the main process chamber. For example, it is thus possible to compensate for asymmetries of the volume flow caused by machining devices present in the process chamber or caused by an asymmetrical arrangement of fluid inlets. Such compensation can be achieved by providing different opening cross-sections for the individual valve sub-openings.

In particular, the flow behaviour within the chamber can be set in such a way that it is possible to compensate for an asymmetric flow caused for example by a device in the chamber for machining a substrate. The flow would accordingly take place in an inhomogeneous manner through the process chamber if using a conventional valve. Because the outflow behaviour can be set by means of the valve according to the invention, the outflow of fluid can counteract the asymmetrical flow through the chamber and thus ultimately result in a flow through the chamber that is symmetrical overall. The flow through the valve may in this case accordingly take place in an asymmetrical manner (non-centric, i.e. asymmetrical in relation to a central axis). By way of example, there may be different flow velocities on different (for example opposite) sides of the valve.

In one embodiment, the drive unit, in particular the respective drive components, and at least the first valve plate (or also the second, the third or more valve plates) may be designed and coupled in such a way that at least the first of the valve plates can be moved along a first movement axis, and the first movement axis extends transversely relative to the first opening axis. It will be understood that the number of valve plates preferably corresponds to the number of valve seats, i.e. a valve may have a plurality of (more than three) valve seats and a corresponding number of valve plates.

According to one embodiment, the main process chamber may enclose a main internal volume and the secondary process chamber may enclose a secondary internal volume, the main internal volume being larger than the secondary internal volume.

In one embodiment, the vacuum machining system may have an electrostatic holding device, in particular a chuck, arranged in the main process chamber.

The vacuum regulating valve may in particular have at least the first valve seat and at least two further valve seats, and the valve seats may define a first valve opening and at least two further valve openings. The valve seats may be arranged symmetrically around the electrostatic holding device.

In one embodiment, the valve seats and/or the valve openings may be ring-segment-shaped and may be arranged in such a way that respective inner arcs or outer arcs of the ring-segment-shaped valve seats and/or valve openings lie on a common circle.

The chuck may for example be round and/or may define a circular surface as a holding surface for a substrate. Due to the overall ring-shaped arrangement of the valve opening around the chuck, a correspondingly optimized fluid flow behaviour around and over the chuck can be achieved.

In one embodiment, the first and the second valve sub-opening, in particular the third valve sub-opening, may be arranged symmetrically around a central axis of the vacuum regulating valve, the central axis extending through a valve centre and in particular forming a central axis of the flow channel. Due to its geometry, the valve may define on the one hand a flow path for a fluid, and thus on the other hand a bounded flow channel for the fluid. The central axis lies in particular in the middle of this channel and extends along the extension of the channel. A centre of the chuck support surface lies in particular on the central axis.

By means of a valve according to the invention, the flows mentioned above can advantageously be regulated, i.e. even at very low pressures and while providing and maintaining a substantially symmetrical and laminar flow.

The vacuum machining system may in particular comprise a control unit, in particular a regulating unit, wherein the drive unit (and the drive components thereof) can be actuated on the basis of a control signal provided by the control unit, in particular on the basis of a regulating variable.

In particular, each drive component of the drive unit may be able to be actuated individually by means of an (individual) control signal.

In one embodiment, the control unit may have a flow functionality configured in such a way that, upon execution thereof, at least one of the valve plates coupled to the drive unit is moved to an intermediate position between the open position and the closed position.

In particular, the at least one coupled valve plate may be able to be moved linearly along a movement axis and a distance between the contact surface of said valve plate and the corresponding sealing surface in the intermediate position may be smaller than in the open position and greater than in the closed position.

According to one embodiment, the vacuum regulating valve may have at least the first and the second valve seat, the first and the second valve plate, as well as the first drive component, which is coupled to the first valve plate, and the second drive component, which is coupled to the second valve plate. The flow functionality may in this case be configured in such a way that the valve plates can be individually positioned between the respective open position and the respective closed position as a function of flow information.

The advantageous pressure and flow regulation is made possible by such a targeted relative and individual open position between the valve seat and the valve closure and the resulting settable opening area of the valve opening. Such regulation may typically be used, for example, when using process gas and thus having to set a setpoint pressure. By thus creating a continuous laminar flow of the medium through the openings and in particular through the main process chamber, pressure fluctuations can be avoided and a setpoint pressure can be reached more quickly.

In particular, the individual plate positions (intermediate positions) can each be set individually or sequentially in a controlled manner (by means of the control signal), and thus the volume flow or mass flow of a medium through the valve opening can in particular be continuously regulated. The flow can in particular be kept laminar. Such regulation is provided in particular by a stepper motor or a servo motor of the drive unit.

The flow information may in particular comprise or provide at least one of the following items of information:
- a mass flow or volume flow of the fluid through the main process chamber and/or the secondary process chamber,
- a flow velocity of the fluid in the main process chamber and/or secondary process chamber,
- a flow velocity distribution with respect to an internal volume cross-section for the main process chamber and/or the secondary process chamber,
- a pressure difference between the main process chamber and the secondary process chamber,
- a fluid inflow into the main process chamber,
- a fluid outflow out of the secondary process chamber.

By means of the control unit, the individual valve plates can be individually positioned in such a way that a symmetrical fluid flow through the main process chamber can be provided as a function of the flow information. For example, when there is an uneven fluid distribution in one of the process chambers or when there is a spatially uneven inflow of fluid into the main process chamber, this can be achieved by setting and/or dynamically adjusting different opening cross-sections for the individual valve sub-openings. However, this can also be achieved, for example, by setting equal opening cross-sections for the valve sub-openings if the fluid distribution or the fluid inflow is homogeneous.

In one embodiment, the positioning of the valve plates can be individually dynamically adjusted and thus the fluid flow through the main process chamber can be continuously regulated. If the fluid distribution in the process chamber changes, for example if a new or different process gas is added, the valve plate positions can be adjusted during or before a machining process.

In one embodiment, a defined flow behaviour can be set and/or regulated by the vacuum regulating valve, in particular by the at least two valve sub-openings, in particular wherein the flow behaviour can be set by the vacuum regulating valve in an asymmetric manner with respect to a central axis of the vacuum regulating valve and the central axis extends through a valve centre.

In one embodiment, if there is an inhomogeneous fluid flow through the main process chamber, a symmetrical fluid flow can be set by executing the flow functionality.

The vacuum machining system comprises in particular at least one sensor unit, which is designed in such a way that the flow information can be detected by means of the sensor unit, in particular a pressure sensor or a sensor for chemically analysing a gas composition.

In one embodiment, the flow path may connect the main process chamber and the secondary process chamber, wherein the main process chamber can be separated from the secondary process chamber in a gas-tight manner by the vacuum regulating valve, i.e. the flow path can be closed.

According to one embodiment, the first valve seat and the second valve seat may be arranged in a common plane. Alternatively, the first valve seat and the second valve seat may be arranged at an angle relative to each other in such a way that the plane defined by the first sealing surface and the plane defined by the second sealing surface enclose a defined angle. The valve seats may for example be oriented in such a way that the defined sealing planes each comprise one side face of a virtual pyramid.

In one embodiment, the orientation may be such that the opening axes defined by the respective valve opening of a valve seat intersect, in particular intersect at a common point of intersection. The common point of intersection lies in particular on the central axis of the valve.

According to one embodiment, the drive unit comprises at least one motor and at least one guide component, in particular a valve rod or guide rod, which can be moved along a movement axis in a manner controlled by the at least one motor, wherein the valve plate with the guide component can be moved relative to the valve seat.

The position of the movement axis is in particular defined by the extension of the guide component, which for example is designed and referred to as a push rod, valve rod or guide rod, and/or by the linear movement direction provided by the drive unit.

In one embodiment, the vacuum machining system or the vacuum regulating valve may have a separating device for separating a process atmosphere area from an external atmosphere area. In particular, this relates to a design of the regulating valve as a vacuum valve.

The process atmosphere area is to be understood in particular as an area that can be defined by a process chamber (vacuum chamber). A process atmosphere, in particular a vacuum, for machining substrates can be established in this area. Components intended for this area must satisfy enhanced requirements, for example with regard to material resistance and atmospheric purity (particle generation). The external atmosphere area can accordingly be understood in particular as an area which surrounds the process chamber and in which for example normal atmospheric conditions prevail, for example room air.

The drive unit may be assigned at least in part, in particular in full, to the external atmosphere area, and the valve seat and the valve closure may in particular be assigned to the process atmosphere area.

The separating device may be formed, for example, by a bellows. The bellows may be provided, for example, within the valve housing or the drive unit.

By way of example, the vacuum regulating valve of the vacuum machining system, in particular the drive unit, may have a drive housing in which the valve rod for moving the valve plate is movably mounted. At one side, the valve rod protrudes out of the drive housing into the secondary process chamber (process atmosphere area); at the other side, it is coupled to a motor, for example by means of a transmission. Here, a separating device (for example a dynamic bellows) may be provided, the first end of which is connected to the housing (or to another static element in the drive housing) in a gas-tight manner, and the second end of which is connected to the valve rod in a gas-tight manner. This results in atmospheric separation of the location at which the valve rod is mounted (external atmosphere area), where particles could be generated by the relative movements that occur and where lubricants are possibly used, from the process atmosphere area that is critical in terms of atmospheric purity, while at the same time enabling one or more valve plates to move in a controlled manner.

A housing is made, for example, of aluminium or stainless steel, or is coated on the inside with aluminium or with another suitable material, while the valve plate and bellows may be made of steel. As an alternative or in addition, the bellows may comprise a nickel-based alloy or may be made of a nickel-based alloy. The bellows, which can be expanded and compressed in its longitudinal axis within the movement travel range of the plate, thus seals off the process atmosphere area from the external atmosphere area in an air-tight manner. Two types of bellows in particular are used: on the one hand a diaphragm bellows, and on the other hand a corrugated bellows, the latter being distinguished from the diaphragm bellows by the fact that it has no weld seams and can be cleaned more easily, but has a smaller maximum travel.

BRIEF DESCRIPTION OF THE DRAWINGS

The device according to the invention will be described in greater detail below, purely by way of example, on the basis of specific exemplary embodiments which are shown schematically in the drawings. Further advantages of the invention will also be discussed. In detail.

DETAILED DESCRIPTION

Figure 1:
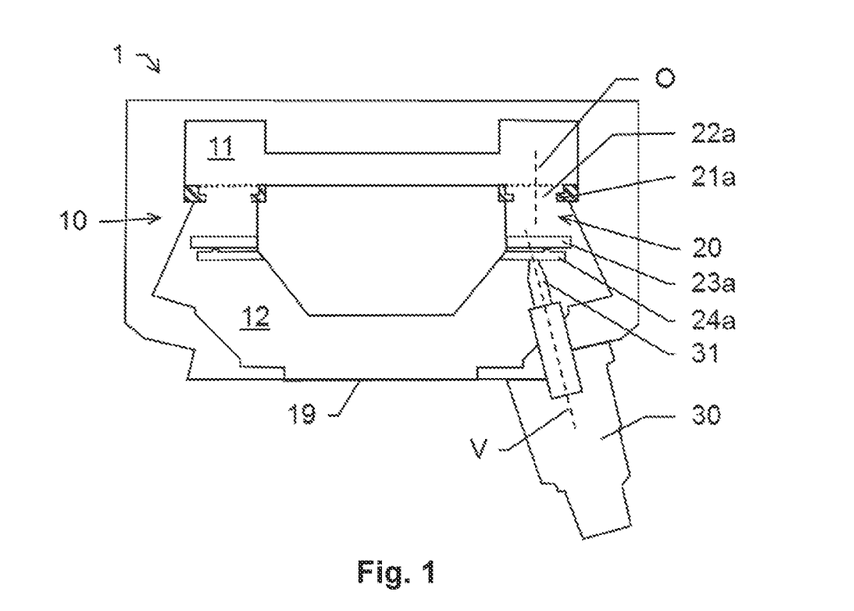
FIG. 1 shows a first embodiment of a vacuum machining system according to the invention.

FIG. 1 shows, in a sectional side view, a first embodiment of a vacuum machining system 1 comprising a vacuum chamber 10 (process chamber) and a vacuum regulating valve 20. The vacuum regulating valve 20 is designed to regulate a volume flow or mass flow of a fluid flowing through the vacuum chamber 10 and to interrupt a flow path of the fluid in a gas-tight manner. To this end, the vacuum regulating valve 20 has a valve seat 21a, which defines a valve opening 22a with an opening axis O. The valve 20 additionally has a valve plate 23a. The valve seat 21a provides a sealing surface on its underside, the valve plate 23a having a contact surface (plate-side sealing surface) which is designed to be brought into contact with the (seat-side) sealing surface and thus enables gas-tight closure of the valve 20. Contact is made in particular indirectly by way of a seal provided between the seat-side sealing surface and the plate-side sealing surface. Although the structural elements valve seat and valve plate are not physically in direct contact here (i.e. only indirectly by way of the seal located therebetween), this state is to be understood as an in-contact state.

The valve plate 23a can be moved by means of a drive unit 30 from an open position (shown in FIG. 1) to a closed position (not shown). In the closed position, sealing contact therefore exists between the sealing surface and the contact surface via a sealing element located therebetween. The valve opening 22a is thereby closed in a gas-tight manner.

The sealing element may be a polymer-containing seal, which is arranged on the underside of the valve seat 21a by means of clamping, adhesive bonding or vulcanization. The seal may be designed, for example, as an O-ring. Alternatively, the sealing element may be arranged on the valve plate 23a.

The drive unit 30 may be, for example, an electrically operated actuator or motor (for example a linear motor or stepper motor) with a linear movement axis V. The drive unit 30 may provide a travel of at least 50 mm, in particular 100 mm.

The valve seat 21a is arranged within the vacuum chamber 10. The vacuum chamber 10 is divided by the valve seat 21a, and thus by the place where gas-tight closure can take place (sealing line), into a main process chamber 11 for machining a substrate and into a secondary process chamber 12.

A bottom opening 19 of the secondary process chamber 12 connects the vacuum chamber 10 to a downstream vacuum generator, in particular a vacuum pump, for generating the vacuum in the chamber 10. A vacuum valve and/or a pressure sensor may also be provided as a further downstream component.

The vacuum valve 20 is installed in the chamber 10 in such a way that the first sealing surface of the valve seat 21a extends orthogonally to the opening axis O and points in a direction towards the secondary process chamber 12, parallel to the first opening axis O. The valve plate 23a is correspondingly movably arranged in the secondary process chamber 12.

In the embodiment shown, the valve plate 23a is mounted on a guide element 24a. In particular, the mounting is such that the valve plate 23a is (slightly) tiltable relative to the guide element 24a. The drive unit 30 is coupled to the guide element 24a by means of a valve rod 31, whereby the valve plate 23a can be moved by means of the drive unit 30.

In another embodiment, the valve plate 23a may be coupled directly to the valve rod 31. The valve plate 23a may in this case be tiltable relative to the valve rod within narrow limits, so that the contact surface can be brought fully into contact with the sealing surface. Such a tilting may provide a reliable closure of the opening 22a, particularly when the movement axis V is arranged at an angle relative to the opening axis O. An angled arrangement as shown enables in particular an advantageous use of space in such a way that the movement device (for example the valve rod) takes up a comparatively small amount of space in the vacuum chamber 10 and the drive unit 30 can be arranged in a manner that is advantageous with regard to peripheral vacuum elements. Possible downstream elements can in this case be connected to the secondary process chamber 12 without any problem, i.e. without any limitation on space caused by the drive unit 30.

It will be understood that the valve plate may alternatively be rigidly connected to the valve rod. Also in this case, the plate may be connected to the rod in such a way that the movement axis V encloses an angle between 0° and 90° with a plane defined by the seat-side sealing surface, i.e. is arranged transversely thereto.

The drive unit 30 may additionally have a bellows for separating the atmosphere of the internal volume of process chamber 10 (process atmosphere area) from an external chamber (external atmosphere area). To this end, the bellows may be connected at one side to the valve rod 31 and at the other side to the inner drive housing. As a result, atmospheric separation of the moving part of the drive unit from the internal volume of the process chamber 10 can be provided. Any ingress of particles, caused for example by abrasion, can thus be prevented. The bellows is compressed when the valve is open and is expanded or unfolded when the valve 20 is closed.

The embodiment according to the invention offers the advantage that the volume of the main process chamber 11, in which the effective machining of the substrate takes place, can be kept comparatively small and thus a desired internal pressure in the main process chamber 11 for a particular machining process can be set comparatively quickly.

The secondary process chamber 12 provides an internal volume which is larger than the internal volume of the main process chamber 11 and in which an internal pressure that corresponds to or is lower than a setpoint machining pressure can be set by extracting air through the opening 19. The secondary process chamber 12 can thus serve as a holding volume for the main process chamber 11 and can provide for quickly setting a process pressure in the main process chamber 11.

Figure 2:
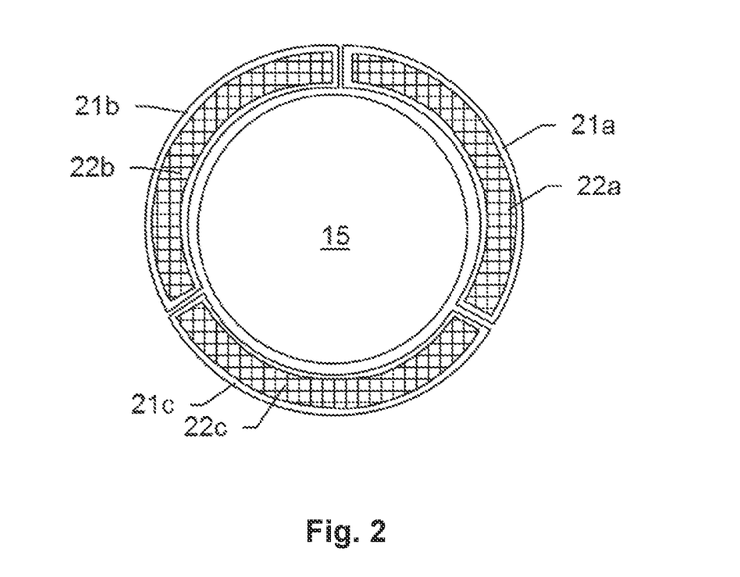
FIG. 2 shows an embodiment of a vacuum valve of a vacuum machining system according to the invention.

FIG. 2 shows, in a plan view, the vacuum regulating valve of the vacuum machining system according to FIG. 1. The valve has a total of three valve seats 21a-c, which are arranged in the shape of a ring. Each valve seat 21a-c provides a respective valve opening 22a-c. In the exemplary embodiment shown, the valve openings 22a-c are provided with grid-like structures, which enable a homogeneous fluid flow through the respective opening. In alternative embodiments, the valve openings 22a-c may be designed without the structures shown or with an alternative, fluid-permeable structure.

Each valve seat 21a-c is assigned, on the underside thereof (cf. FIG. 3, not shown here), a respective valve closure 23a-c, as shown by way of example in FIG. 1 for the valve seat 21a and the valve closure designed as the valve plate 23a. The individual valve closures are each coupled to an individually controllable drive unit (depending on the number of valve plates, a corresponding number of drive components is provided).

As a result, an individual opening cross-section and thus an individual throughflow can be set for each valve opening 22a-c. A mass flow or volume flow of a fluid can therefore be set for each valve opening individually and independently of the rest of the openings. Due to this ability to be set individually, a symmetrical fluid flow can be provided in particular through the main process chamber 11. To this end, for example, different offsets can be set for the individual valve openings, and inhomogeneous pressure and flow distributions can thus be compensated.

By providing a flow of process fluid through the process chamber that is as symmetrical and as homogeneous as possible, a substrate can accordingly be machined accurately and precisely. A symmetrical flow can ensure, for example, that a comparable or identical process gas concentration exists across the (entire) substrate surface and, for example, any deposition or etching (for example ALD or ALE process) accordingly takes place homogeneously along the surface.

The valve seats 21a-c of the vacuum regulating valve are arranged symmetrically around an electrostatic holding device 15 (chuck). The substrate to be machined can be placed on the holding device 15 and accordingly held by means of an electrostatic charge. In other words, the chuck 15 is designed to receive a substrate and to hold it at least during a machining process.

Due to this concentric arrangement of the chuck 15 and of the valve seats 21a-c, a symmetry and homogeneity of the fluid flow can be achieved in an optimized manner. A largely homogeneous flow around the chuck 15 can thus be achieved, while at the same time the flow rates through the individual openings 22a-c can be set individually. As a result, a correspondingly high degree of homogeneity with regard to the machining of the substrate can thus be provided.

In addition, arranging the valve close to the chuck 15 and around the chuck 15 advantageously limits a particle flow or the particle flow conductance in the region of the chuck 15 (particularly in the closed position). As a result, the sealing line of the valve is located comparatively close to the chuck 15, i.e. close to the substrate machining location. This leads directly to improved (homogeneous) substrate machining.

By moving a valve plate gradually closer to the associated valve seat 21a-c, for example, the opening cross-section of the relevant valve sub-opening can be gradually, in particular continuously, reduced.

The vacuum regulating valve 20 thus also provides the possibility of setting a fluid flow through the valve opening(s) in a targeted manner. If, therefore, a particular internal pressure is to be provided in the main process chamber, the vacuum regulating valve 20 can be used to set a particular quantity (mass or volume) of fluid that flows out per unit of time. The regulating variable used for this may be, for example, an internal pressure in the main chamber 11 determined by means of a pressure sensor. Alternatively, the opening cross-section can be set and varied in a controlled manner on the basis of a predetermined rule.

It should be noted that the invention is not limited solely to embodiments with three valve sub-openings, valve seats and valve plates, but rather extends in particular also to those solutions that have two or more than three valve openings, valve seats and valve plates.

Dividing the total valve opening into a plurality of sub-openings 22a-c also offers the advantage that also a plurality of valve closures 23a-c is provided, and thus the mass of each individual closure can be reduced individually. Due to the lower individual masses to be moved, significantly shorter movement times can be achieved, i.e. the time required to move one or all of the valve closures from an open position to a closed position (or vice versa) can be shortened.

In addition, the likelihood of the valve disadvantageously snapping shut when the valve opening is very small can be reduced since the forces applied to the individual valve plates are in each case significantly smaller than the force would be in the case of one continuous valve plate of equal surface area, and counteracting holding forces are accordingly easier to achieve in design terms.

An initially asymmetrical fluid flow through the chamber 11 can be compensated by means of the vacuum regulating valve 20 according to the invention. By providing different open states of the individual valve sub-openings 22a-c, which can additionally be dynamically adjusted, an asymmetry with regard to the gas flow can be compensated. To this end, the valve closures 23a-c can be moved into different positions (distances from the respective valve seats), as a result of which different opening cross-sections are provided. The fluid then no longer flows out centrally through the valve, but rather also asymmetrically within the valve with respect to the central axis.

Due to the different open states, the fluid flow can be set to vary across the course of a chamber cross-section. In other words, the flow behaviour of a gas can be set differently in different areas of the chamber, for example different flow velocities can be set on opposite chamber walls.

By variably setting the fluid flow through the valve 20 in this way, an inhomogeneous, uneven flow behaviour—caused for example by a non-central inflow of a process gas—can be compensated such that a resulting flow around the chuck 15 is symmetrical (homogeneous).

Figure 3:
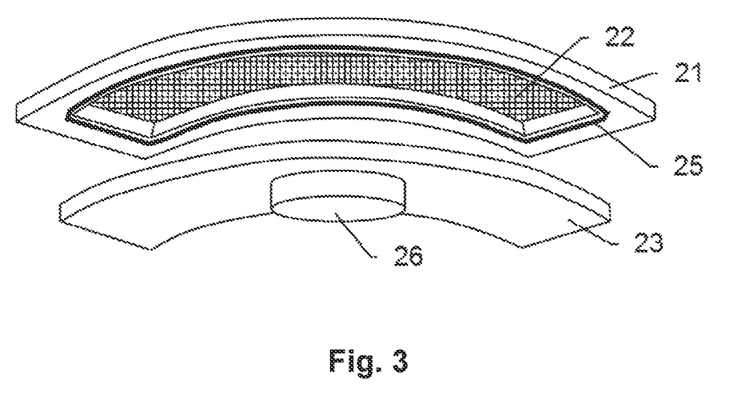
FIG. 3 shows an embodiment of a vacuum valve of a vacuum machining system according to the invention.

FIG. 3 shows, in a perspective view, an embodiment of a valve seat 21 together with a corresponding valve plate 23 of a vacuum machining system according to the invention.

The valve seat 21 is embodied by a plate, which has the shape of a ring segment. The valve seat 21 defines a valve opening 22, through which a fluid (for example process gas or precursor) can flow. The valve opening 22 is surrounded by a sealing surface with a sealing element 25. The sealing element 25 (and the sealing surface) is arranged on the underside of the valve seat 21, i.e. on the side facing away from the main process chamber 11 when installed as intended.

The valve seat 21 additionally has, on the upper side opposite the underside, a structure which is permeable to a process fluid and through which a flow can pass. The structure may be designed, for example, as a grid, as a perforated film, in a lamellar manner, etc. The structure provides for increased stability of the valve seat 21 and also for homogenizing the fluid flow, i.e. one stream can be divided into individual sub-streams by a plurality of through-channels provided by means of the structure and thus an improved laminar flow behaviour can be achieved.

Alternatively, the valve seat 21 may be designed without the structure.

The plate-like design of the valve seat 21 enables easy and quick installation or replacement of the seat 21 in a vacuum machining device, as shown for example in FIG. 1. The valve seat plate 21 can be inserted and fixed in the process chamber (main process chamber 11) from above and can likewise be removed from above, without any complicated dismantling of the rest of the valve or of the chamber being necessary. The valve seat plate 21 can be supplied or removed, for example, through a transfer opening of the process chamber (not shown), through which the substrate to be machined can be introduced into and/or removed from the chamber.

In terms of its shape and spatial extent, the valve plate 23 corresponds to the valve seat 21, in particular to the seal 25. By pressing the plate 23 against the seal 25 from below, the opening 22 can be closed in a gas-tight manner. The valve plate 23 has on its upper side (not visible) a contact surface which corresponds to the shape and spatial extent of the seal 25 and/or of the sealing surface bearing the seal 25. When the valve is closed, the contact surface is brought into contact with the seal 25.

The valve plate 23 additionally has, on its underside, a coupling element 26 for coupling the drive unit to the plate 23.

The valve plate 23, like the valve seat, can be installed from above in a vacuum machining system according to the invention, in particular in the secondary process chamber 12. To this end, the plate 23 can likewise be supplied or removed, for example, through a transfer opening of the process chamber (not shown), through which the substrate to be machined can be introduced into and/or removed from the chamber.

The resulting comparatively easy removal and/or installation of both the valve seat 21 and the valve plate 23 is particularly advantageous with regard to predictive/preventive maintenance or possible repair work. By way of example, the sealing elements arranged on the valve seats 21a-c are exposed to material stress with each movement to or from the closed position and must therefore be replaced or renewed in regular cycles. Due to the advantageous modular construction, a significant time saving compared to conventional valve solutions can be achieved for this maintenance activity.

It will be understood that the illustrated figures schematically show only possible exemplary embodiments. According to the invention, the various approaches can also be combined with one another and with prior art methods and devices for regulating a volume flow or pressure in a process volume under vacuum conditions.

The invention claimed is:

1. A vacuum machining system, comprising
a vacuum chamber which defines an evacuable internal volume for generating a vacuum and for machining a substrate in the internal volume, and
a vacuum regulating valve for regulating a volume flow or mass flow of a fluid flowing through the vacuum chamber and for interrupting a flow path of the fluid, said valve comprising:
a first valve seat, which has a first valve opening defining a first opening axis and a first sealing surface extending around the first valve opening, and
a first valve plate with a first contact surface corresponding to the first sealing surface, and
a drive unit coupled to the first valve plate configured to move the first valve plate at least from
an open position, in which the first valve plate and the first valve seat are not in contact with each other, to
a closed position, in which a sealing contact between the first sealing surface and the first contact surface exists via a sealing element located therebetween and the first valve opening, wherein the closed position provides a gas-tight closure,
and back again,
wherein:
the first valve seat is arranged within the vacuum chamber and divides the vacuum chamber into a main process chamber for machining the substrate and into a secondary process chamber,
the first sealing surface extends orthogonally to the first opening axis and points in a direction of the secondary process chamber, and
the first valve plate is movably arranged in the secondary process chamber.

2. The vacuum machining system according to claim 1, wherein:
the vacuum regulating valve has
a second valve seat, which has a second valve opening defining a second opening axis and a second sealing surface extending around the second valve opening, and
a second valve plate with a second contact surface corresponding to the second sealing surface, wherein:
the second valve seat is arranged within the vacuum chamber and, together with the first valve seat, divides the vacuum chamber into the main process chamber and the secondary process chamber,
the second sealing surface extends orthogonally to the second opening axis and points in the direction of the secondary process chamber, and
the second valve plate is movably arranged in the secondary process chamber,
wherein a total valve opening of the vacuum regulating valve is formed at least by the first valve opening as a first valve sub-opening and the second valve opening as a second valve sub-opening.

3. The vacuum machining system according to claim 1, wherein:
the vacuum regulating valve has
a third valve seat, which has a third valve opening defining a third opening axis and a third sealing surface extending around the third valve opening, and
a third valve plate with a third contact surface corresponding to the third sealing surface,
wherein:
the third valve seat is arranged within the vacuum chamber and, together with the first valve seat and a second valve seat, divides the vacuum chamber into the main process chamber and the secondary process chamber
the third sealing surface extends orthogonally to the third opening axis and points in the direction of the secondary process chamber and
the third valve plate is movably arranged in the secondary process chamber
wherein a total valve opening is additionally formed by the third valve opening as a third valve sub-opening.

4. The vacuum machining system according to claim 3, wherein:
the drive unit is coupled to the second valve plate and the third valve plate to move the coupled valve plates at least from:
a respective open position, in which the respective valve plate and the respective valve seat are not in contact with each other, to
a closed position, in which axially sealing contact between the respective sealing surface and the respective contact surface exists via a respective sealing element located therebetween and the respective valve sub-opening, wherein the closed position provides a gas-tight closure,
and back again.

5. The vacuum machining system according to claim 4 wherein the vacuum regulating valve has a coupling arrangement to mechanically couple the first valve plate to the second valve plate, and to the third valve plate, and is connected to the drive unit to allow the respective valve plates to be jointly moved by means of the drive unit.

6. The vacuum machining system according to claim 5 wherein:
the drive unit has at least a first, a second, and a third, drive component, and
the first drive component is coupled to the first valve plate, the second drive component is coupled to the second valve plate, and the third drive component is coupled to the third valve plate.

7. The vacuum machining system according to claim 6, wherein:
the drive unit and at least the first valve plate are configured to allow:
at least the first of the valve plates to be moved along a first movement axis, and
wherein the first movement axis extends transversely relative to the first opening axis.

8. The vacuum machining system according to claim 7, wherein:
the main process chamber encloses a main internal volume and the secondary process chamber encloses a secondary internal volume, the main internal volume being larger than the secondary internal volume.

9. The vacuum machining system according to claim 1, wherein:
the vacuum machining system has an electrostatic holding device, arranged in the main process chamber.

10. The vacuum machining system according to claim 9, wherein:
the vacuum regulating valve has at least the first valve seat and at least two further valve seats, and the valve seats define a first valve opening and at least two further valve openings, and
the valve seats are arranged symmetrically around the electrostatic holding device.

11. The vacuum machining system according to claim 10, wherein:
the valve seats and/or the valve openings are ring-segment-shaped and respective inner arcs or outer arcs of the ring-segment-shaped valve seats and/or valve openings lie on a common circle.

12. The vacuum machining system according to claim 1, wherein;
the vacuum machining system comprises a control unit, wherein the control unit is a regulating unit, and the drive unit can be actuated based on a control signal provided by the control unit, wherein the control signal is a regulating variable.

13. The vacuum machining system according to claim 12, wherein:
each drive component of the drive unit can be actuated individually by means of the control signal.

14. The vacuum machining system according to claim 12, wherein:
the control unit has a flow functionality configured to move at least one of the valve plates coupled to the drive unit to an intermediate position between the open position and the closed position.

15. The vacuum machining system according to claim 14, wherein:
the at least one coupled valve plate can be moved linearly along a movement axis and a distance between the contact surface of said valve plate and the corresponding sealing surface in the intermediate position is smaller than in the open position and greater than in the closed position.

16. The vacuum machining system according to claim 14, wherein:
the vacuum regulating valve has at least:
the first valve seat and a second valve seat,
the first valve plate and a second valve plate,
a first drive component, which is coupled to the first valve plate, and the second drive component, which is coupled to the second valve plate, and
the flow functionality is configured to individually position the valve plates between the respective open position and the respective closed position as a function of flow information.

17. The vacuum machining system according to claim 16, wherein:
the flow information comprises one or more of:
a mass flow or volume flow of the fluid through the main process chamber and/or the secondary process chamber,
a flow velocity of the fluid in the main process chamber and/or secondary process chamber,
a flow velocity distribution with respect to an internal volume cross-section for the main process chamber and/or the secondary process chamber,
a pressure difference between the main process chamber and the secondary process chamber,
a fluid inflow into the main process chamber, or
a fluid outflow out of the secondary process chamber.

18. The vacuum machining system according to claim 16, wherein:
the valve plates are positioned to allow a symmetrical fluid flow through the main process chamber as a function of the flow information.

19. The vacuum machining system according to claim 16, wherein:
the positioning of the valve plates can be individually dynamically adjusted and thus the fluid flow through the main process chamber can be continuously regulated.

20. The vacuum machining system according to claim 16 wherein:
a defined flow can be set and/or regulated by the vacuum regulating valve, in an asymmetric manner with respect to a central axis of the vacuum regulating valve and the central axis extends through a valve center.

21. The vacuum machining system according to claim 16 wherein:
if there is an inhomogeneous fluid flow through the main process chamber, a symmetrical fluid flow can be set by executing the flow functionality.

22. The vacuum machining system according to claim 16 wherein:
the vacuum machining system comprises at least one sensor unit configured to detect the flow information by means of the sensor unit.

23. Vacuum machining system according to claim 1 wherein the flow path connects the main process chamber and the secondary process chamber, and the main process chamber, wherein the vacuum regulating valve provides a gas tight separation from the secondary process chamber.

* * * * *